United States Patent
Ye et al.

(10) Patent No.: US 12,438,638 B2
(45) Date of Patent: Oct. 7, 2025

(54) ELECTRONIC DEVICE AND ASSOCIATED CONTROL METHOD

(71) Applicant: Realtek Semiconductor Corp., HsinChu (TW)

(72) Inventors: Bixing Ye, Suzhou (CN); Zuohui Peng, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 24 days.

(21) Appl. No.: 18/669,490

(22) Filed: May 20, 2024

(65) Prior Publication Data
US 2025/0158740 A1 May 15, 2025

(30) Foreign Application Priority Data
Nov. 10, 2023 (CN) .......... 202311498116.8

(51) Int. Cl.
 *H04L 1/00* (2006.01)

(52) U.S. Cl.
 CPC .......... *H04L 1/0063* (2013.01); *H04L 1/0041* (2013.01)

(58) Field of Classification Search
 CPC .... H04L 1/0041; H04L 1/0061; H04L 1/0063
 See application file for complete search history.

(56) References Cited

U.S. PATENT DOCUMENTS

| | | |
|---|---|---|
| 2005/0249247 A1 | 11/2005 | Shanley et al. |
| 2016/0142521 A1 | 5/2016 | Rison |
| 2017/0185474 A1* | 6/2017 | Thoukydides ........ H04L 67/568 |
| 2017/0188390 A1* | 6/2017 | Adachi ................. H04L 1/1614 |
| 2023/0223982 A1 | 7/2023 | Guo |

FOREIGN PATENT DOCUMENTS

| | | | |
|---|---|---|---|
| CN | 115643634 A | 1/2023 | |
| EP | 3863326 A1 * | 8/2021 | ......... H04L 69/324 |
| JP | 2002-64470 A | 2/2002 | |
| JP | 2009-5146 A | 1/2009 | |
| JP | 2013-541910 A | 11/2013 | |
| JP | 2021-90188 A | 6/2021 | |

* cited by examiner

*Primary Examiner* — Shelly A Chase
(74) *Attorney, Agent, or Firm* — Winston Hsu

(57) ABSTRACT

The present invention provides a control method of an electronic device, wherein the control method includes the steps of: generating a MAC frame; performing a specific encoding operation on a specific field of the MAC frame to generate a parity; using the parity to replace part of content of the specific field; and generating a packet according to the MAC frame for sending to another electronic device.

12 Claims, 8 Drawing Sheets

| B8 | B9 | B10 | B11 | B12 | B13 | B14 | B15 |

⊕

| Specific pattern | B4 | B5 | B6 | B7 |

=

| X1 | X2 | X3 | X4 | B0' | B1' | B2' | B3' |

FIG. 7

ELECTRONIC DEVICE AND ASSOCIATED CONTROL METHOD

BACKGROUND OF THE INVENTION

1. Field of the Invention

The present invention relates to an electronic device with wireless communication function.

2. Description of the Prior Art

In current electronic devices that can wirelessly communicate with each other, the wireless communication chips inside the devices may be manufactured by different vendors, and the wireless communication chips manufactured by different vendors may have different functions. In addition, if these electronic devices are in a relatively complex external environment, such as severe channel interference, etc., the communication quality between these electronic devices is often not very good.

SUMMARY OF THE INVENTION

Therefore, one of the objectives of the present invention is to provide an electronic device that can determine whether the vendor of the wireless communication chip in another electronic devices is the same as its own vendor, so as to assist each other to improve communication quality, to solve the problem described in prior art.

According to one embodiment of the present invention, a control method of an electronic device comprises the steps of: generating a MAC frame; performing a specific encoding operation on a specific field of the MAC frame to generate a parity; using the parity to replace part of content of the specific field; and generating a packet according to the MAC frame for sending to another electronic device.

According to one embodiment of the present invention, an electronic device comprising a processing circuit and a wireless communication module is disclosed. The wireless communication module is configured to perform the steps of: generating a MAC frame; performing a specific encoding operation on a specific field of the MAC frame to generate a parity; using the parity to replace part of content of the specific field; and generating a packet according to the MAC frame for sending to another electronic device.

According to one embodiment of the present invention, a control method of an electronic device comprises the steps of: receiving a packet from another electronic device; determining whether a specific field of a MAC frame of the packet is generated by a specific encoding method; if the specific field of the MAC frame is generated by the specific encoding method, determining that a vendor of the another electronic device and a vendor of the wireless communication module in the electronic device are the same; and if the specific field of the MAC frame is not generated by the specific encoding method, determining that the vendor of the another electronic device is different from the vendor of the wireless communication module in the electronic device.

According to one embodiment of the present invention, an electronic device comprising a processing circuit and a wireless communication module is disclosed. The wireless communication module is configured to perform the steps of: receiving a packet from another electronic device; determining whether a specific field of a MAC frame of the packet is generated by a specific encoding method; if the specific field of the MAC frame is generated by the specific encoding method, determining that a vendor of the another electronic device and a vendor of the wireless communication module in the electronic device are the same; and if the specific field of the MAC frame is not generated by the specific encoding method, determining that the vendor of the another electronic device is different from the vendor of the wireless communication module in the electronic device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a diagram of generating parity according to one embodiment of the present invention.

DETAILED DESCRIPTION

Figure 1:
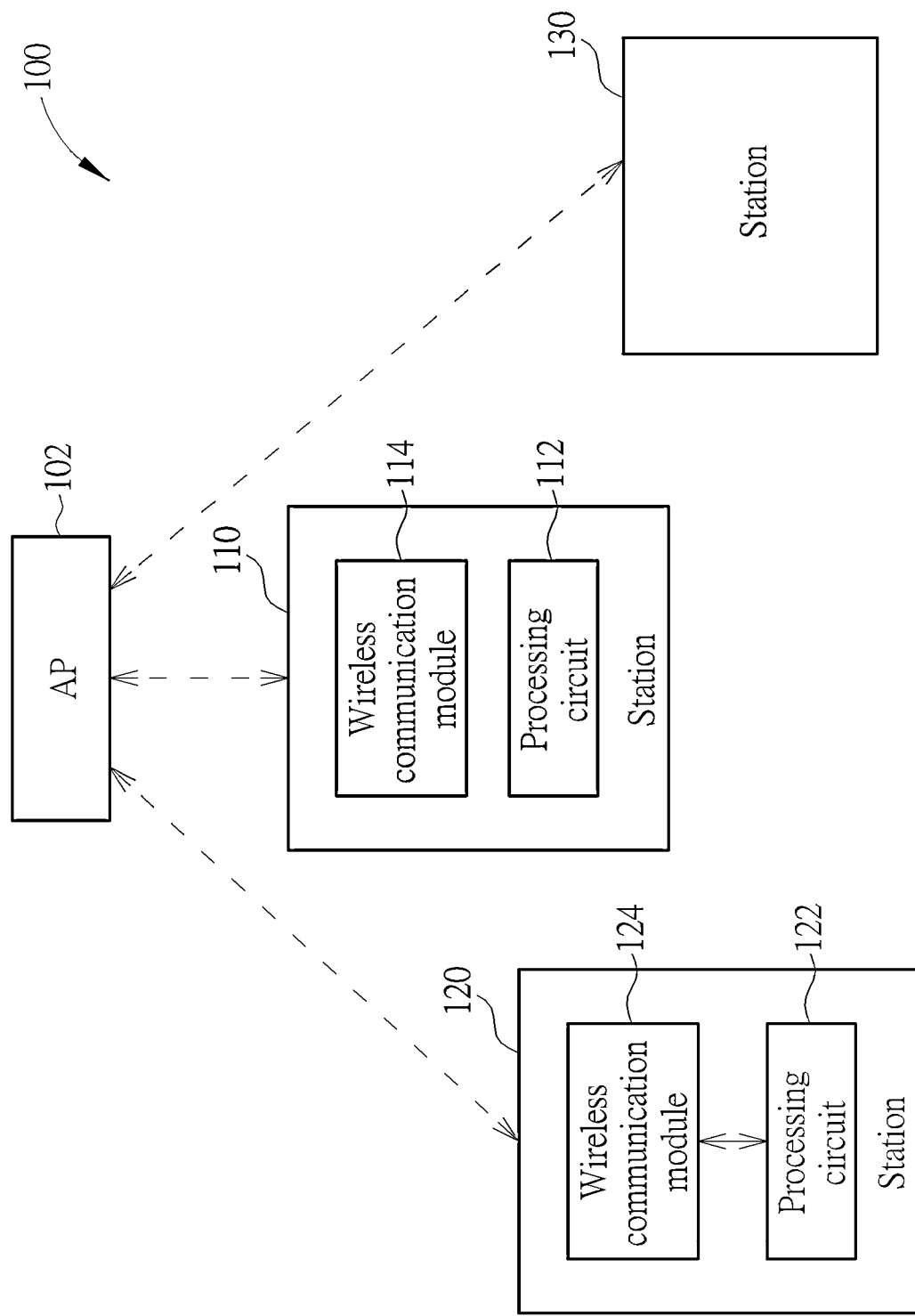
FIG. 1 is a diagram illustrating a wireless communication system according to one embodiment of the present invention.

FIG. 1 is a diagram illustrating a wireless communication system 100 according to one embodiment of the present invention. As shown in FIG. 1, the wireless communication system 100 includes an access point (AP) 102 and a plurality of electronic devices that can perform wireless communication with the AP 102, wherein stations 110, 120 and 130 serve as the plurality of electronic devices in this embodiment. In this embodiment, the stations 110, 120 and 130 can be desktop computers, notebooks, tablets, mobile phones, or other electronic devices with wireless communication functions. The station 110 includes at least a processing circuit 112 and a wireless communication module 114, and the station 120 includes at least a processing circuit 122 and a wireless communication module 124, where each of the processing circuits 112 and 122 may be a processor in the electronic devices, and the wireless communication modules 114 and 124 may include a Media Access Control (MAC) layer circuit and a physical layer circuit.

In the embodiment shown in FIG. 1, since the surrounding environments of the station 110, 120 and 130 are different, and distance between each of the stations 110, 120 and 130 and the AP 102 may also be different, so the connection quality and signal transmission quality of the stations 110, 120 and 130 will also be different. Therefore, the present invention provides a method that allows the station to identify whether the wireless communication modules of other stations belong to the same vendor, so as to assist each other to improve communication quality. In the following description, it is assumed that the station 120 sends a packet, and the station 110 receives the packet from the station 120 to determine whether the wireless communication module 124 of the station 120 belongs to the same vendor as its own wireless communication module 114, but the present invention is not limited to this.

Figure 2:
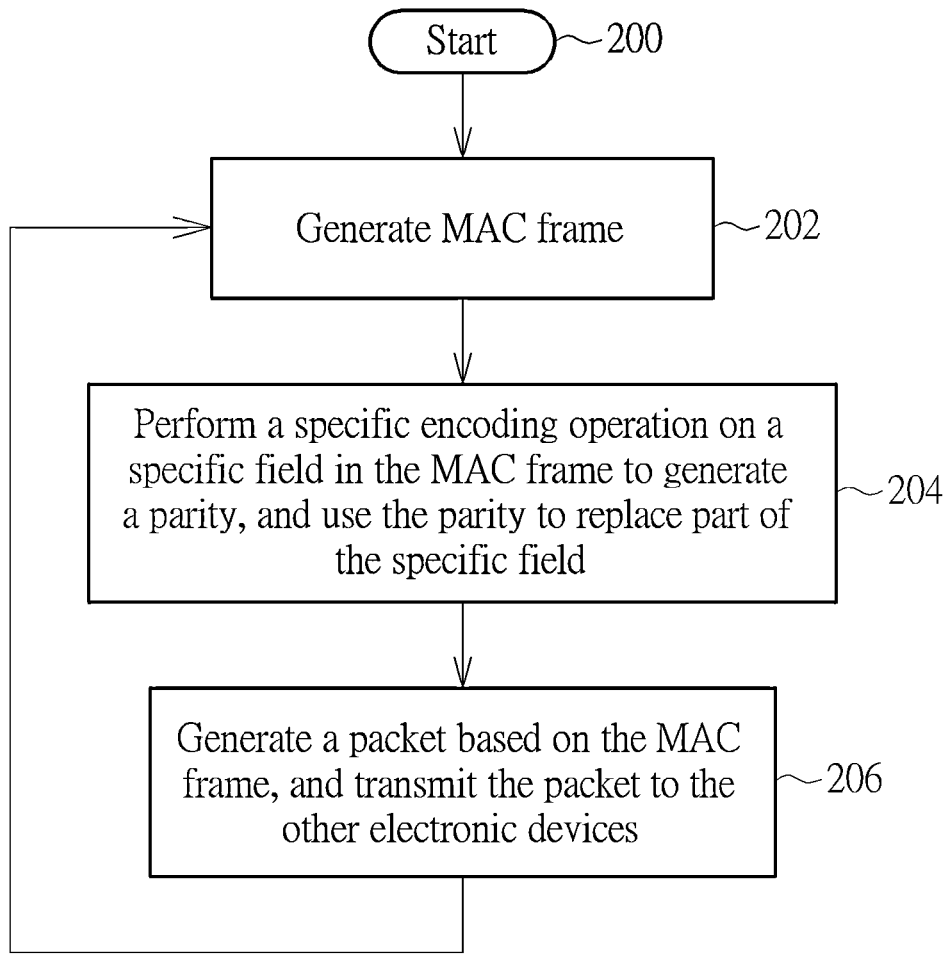
FIG. 2 is a flowchart of a control method of a station according to one embodiment of the present invention.
Figure 3:
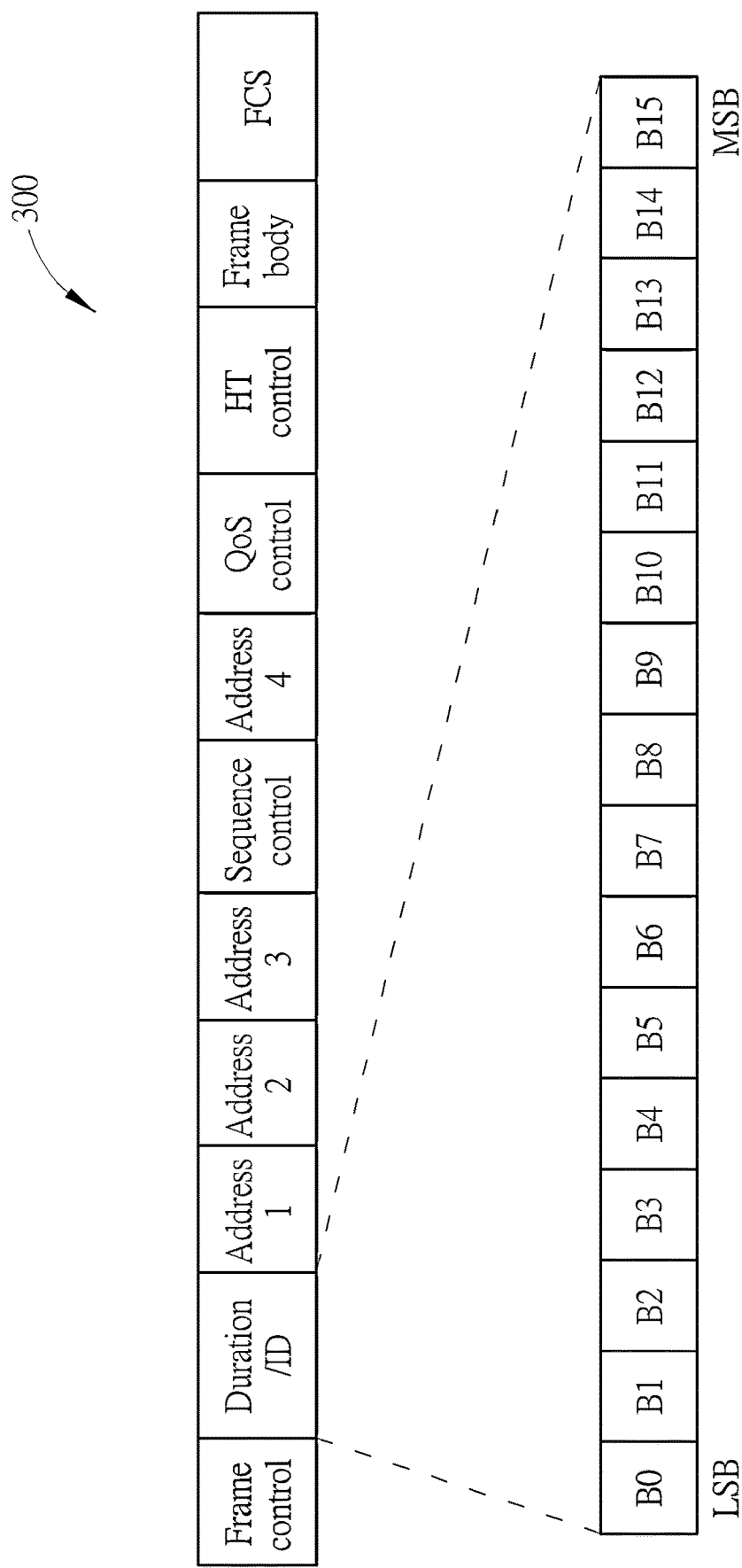
FIG. 3 is a diagram illustrating a MAC frame.

FIG. 2 is a flowchart of a control method of the station 120 according to one embodiment of the present invention. In Step 200, the flow starts, and the station 120 has established a connection with the AP 102. In Step 202, the wireless communication module 124 generates information of a MAC frame 300 as shown in FIG. 3, where the MAC frame includes a plurality of fields, which are respectively frame control, duration/ID, address 1, address 2, address 3, sequence control, address 4, quality of service (Qos) control, high throughput (HT) control, frame body and frame check sequence (FCS). Since the definitions and functions of the fields of the MAC frame 300 have been described in the relevant specifications of IEEE 802.11, and a person skilled in the art can understand these contents, the detailed description will not be repeated here.

Figure 4:
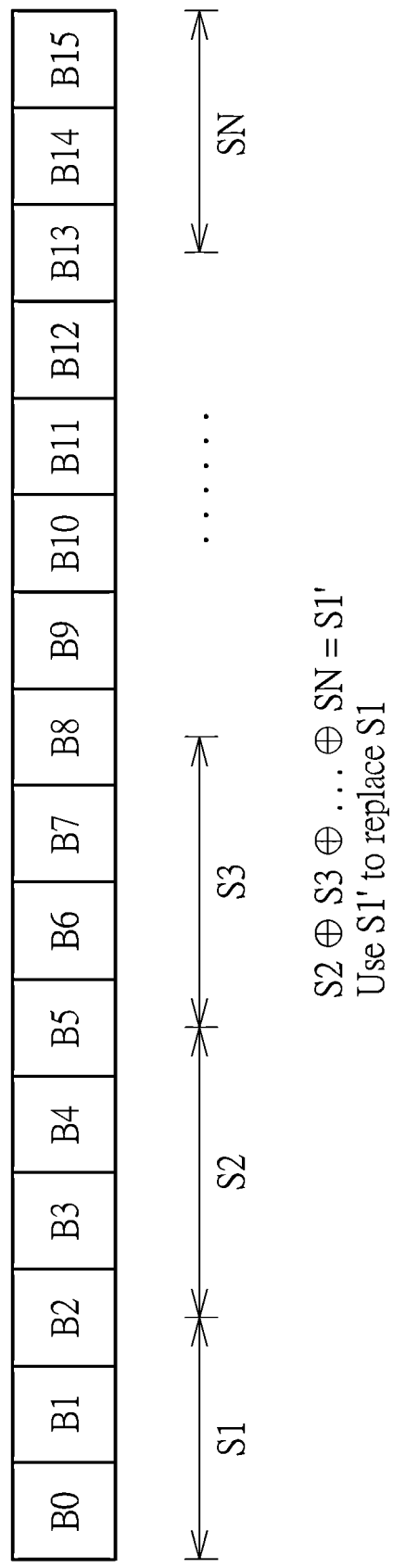
FIG. 4 is a diagram of generating a parity and a modified duration/AID field according to one embodiment of the present invention.

In Step 204, the wireless communication module 124 performs a specific encoding operation on a specific field in the MAC frame 300 to generate a parity, and uses the parity to replace part of the specific field to generate a modified specific field. Referring to FIG. 3 and FIG. 4, in this embodiment, the duration/ID field is used as the specific field, where the duration/ID field may be duration or an association identity (AID), and in most cases the duration/ID field is used to indicate the length of time that the MAC frame will occupy the channel. The duration/ID field includes 16 bits B0-B15, and if it is used to represent the duration, the range represented can be between 0 and 32.767 milliseconds (ms). In addition, for the 16 bits B0-B15 of the duration/ID field, B0 represents a least significant bit (LSB), that is, B0 has the smallest impact on the value of the duration; and B15 represents the most significant bit (MSB), that is, B15 has the greatest impact on the value of the duration. In addition, the bits closer to B15 have a greater impact on the value of the duration. Similarly, the bits closer to B0 have a smaller impact on the value of the duration. In this embodiment, the wireless communication module 124 divides the duration/ID field into a plurality of sections S1-SN, where each of the sections S1-SN includes the same or different number of bits, for example, if the wireless communication module 124 divides the duration/ID field into four sections (that is, N=4), then each of the sections S1-S4 has four bits. Then, the wireless communication module 124 performs an exclusive OR (XOR) operation on the first part of the sections S2, S3, ..., SN to generate a parity S1', and uses the parity S1' to replace the original second part of the sections S1, that is, the four sections of the modified duration/ID field are S1', S2, S3 and S4, respectively.

Figure 5:
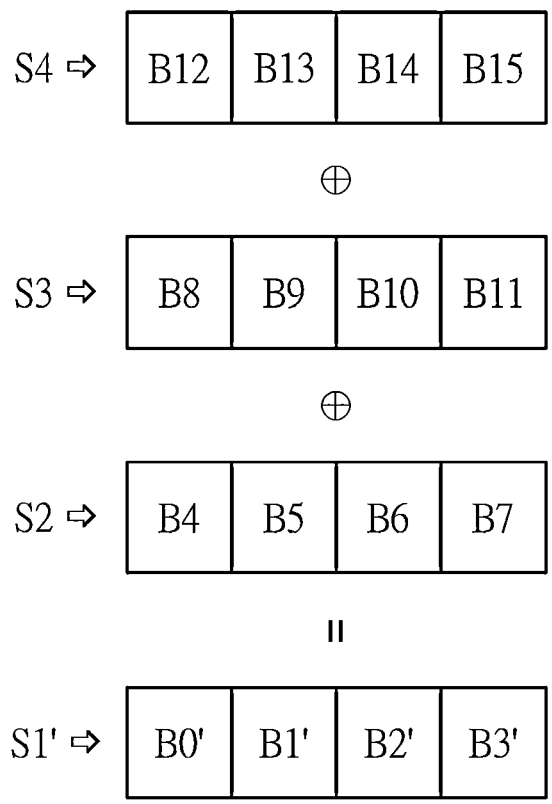
FIG. 5 is a diagram of generating parity according to one embodiment of the present invention.

Specifically, referring to FIG. 5, the wireless communication module 124 divides the duration/ID field into four sections S1-S4, where the section S4 includes B12-B15, the section S3 includes B8-B11, and the section S2 includes B4-B7. Then, the wireless communication module 124 performs XOR operations on B12, B8 and B4 in sequence to generate B0' in the parity S1', performs XOR operations on B13, B9 and B5 in sequence to generate B1' in the parity S1', performs XOR operations on B14, B10 and B6 in sequence to generate B2' in the parity S1', and performs XOR operations on B15, B11 and B7 in sequence to generate B3' in the parity S1'. In this embodiment, B0'-B3' of the parity S1' are used to replace B0-B3 of the section S1, respectively.

In this embodiment, since the section S1 replaced by the parity S1' in the duration/ID field includes the LSB and other bits that have a very small impact on the value of the duration, the difference between the duration represented by the modified duration/ID field and the initially set duration will be within the allowable range, and this difference will not affect the operation of the electronic device in practical applications.

It is noted that, in this embodiment, only when the content represented by the duration/ID field is the duration, the wireless communication module 124 will generate the parity S1' to replace the section S1. That is, if the content represented by the duration/ID field is the AID, so the wireless communication module 124 will not modify the content of the duration/ID field.

In addition, since there is a certain probability that parity S' will be equal to the section S1, in order to enhance the robustness of the parity S1', the wireless communication module 124 can further use one or more specific patterns to perform XOR operations with the sections S2, S3, ..., SN in sequence to generate the parity S1'.

Figure 6:
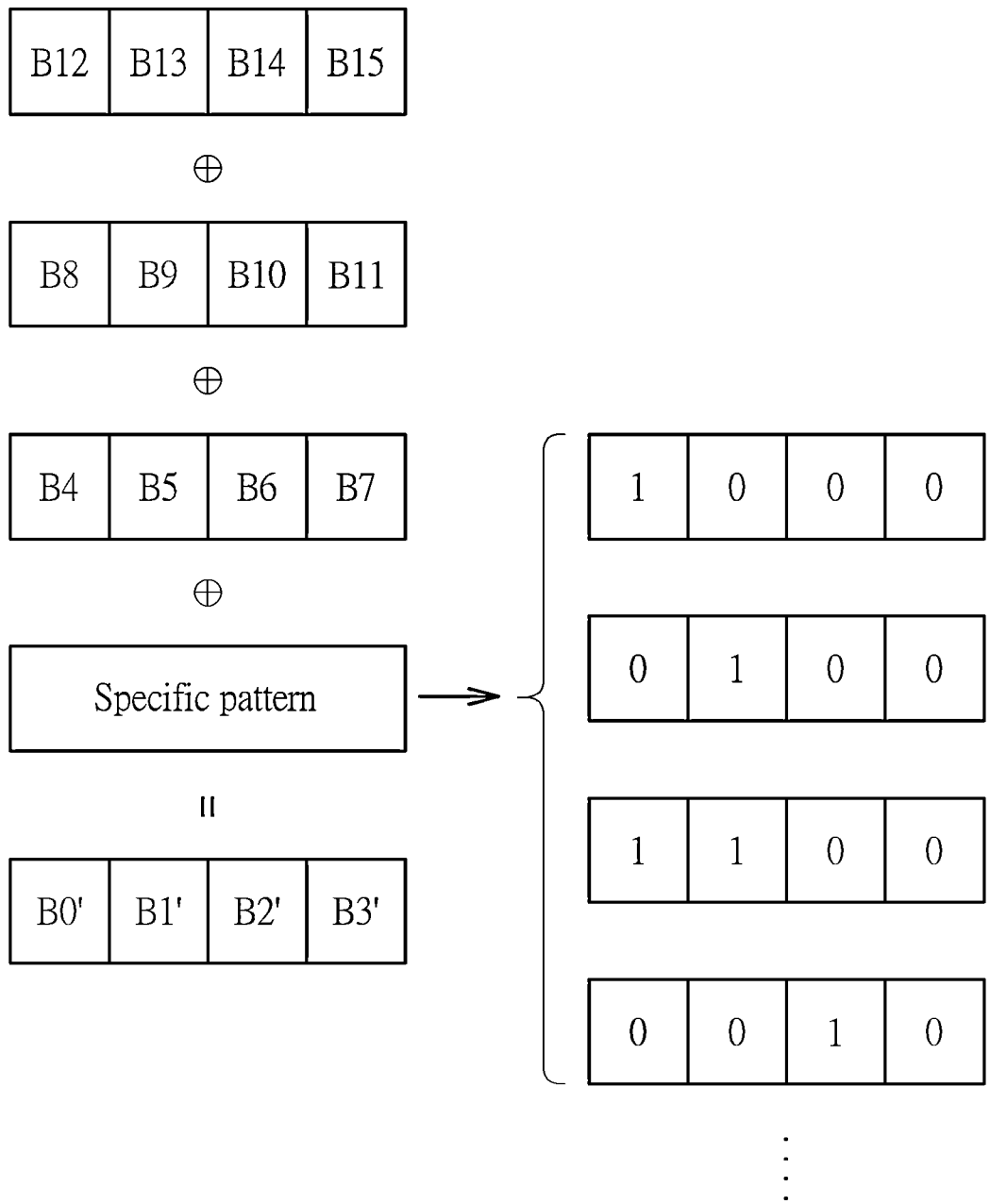
FIG. 6 is a diagram of generating parity according to one embodiment of the present invention.

Taking FIG. 6 as an example, the number of bits of the specific pattern is the same as any one of the sections S1-SN, and the specific pattern can be any combination of bits, such as (1, 0, 0, 0), (0, 1, 0, 0), (1, 1, 0, 0) or (0, 0, 1, 0) shown in FIG. 6. The wireless communication module 124 performs XOR operations on B12, B8, B4 and a first bit of the specific pattern in sequence to generate B0' in the parity S1', performs XOR operations on B13, B9, B5 and a second bit of the specific pattern in sequence to generate B1' in the parity S1', performs XOR operations on B14, B10, B6 and a third bit of the specific pattern in sequence to generate B2' in the parity S1', and performs XOR operations on B15, B11, B7 and a fourth bit of the specific pattern in sequence to generate B3' in the parity S1'. In this embodiment, B0'-B3' of the parity S1' are used to replace B0-B3 of the section S1, respectively.

In another embodiment shown in FIG. 7, the wireless communication module 124 can divide the duration/ID field into three sections, where the first section includes B0-B3, the second section includes B4-B7, and the third section includes B8-B15. The wireless communication module 124 performs XOR operations on B8-B15 of the third section, B4-B7 of the second section and a specific pattern to generate the parity B0'-B3' and X1-X4, and uses the parity B0'-B3' to replace B0-B3 of the original first section. In addition, X1-X4 of the parity can be placed in the remaining addresses or spare addresses of the other field(s) of the MAC frame 300.

In Step 206, the wireless communication module 124 generates a packet, such as a physical layer protocol data unit (PPDU), based on the MAC frame and/or other multiple MAC frames, and transmits the packet to the other electronic devices. After that, the flow goes back to Step 202 to start preparing the content of the next MAC frame.

In the embodiment of FIG. 6, in order to further ensure the robustness of the parity, the wireless communication module 124 can use different specific patterns to generate the parity S1' for different MAC frames. Specifically, the wireless communication module 124 may set four different specific patterns, and these four different specific patterns can be used in the MAC frames sequentially and repeatedly. For example, the wireless communication module 124 performs XOR operations on a first specific pattern and the sections S2, S3, ..., SN of the duration/ID field of a first MAC frame in sequence to generate parity S1'; the wireless communication module 124 performs XOR operations on a second specific pattern and the sections S2, S3, ..., SN of the duration/ID field of a second MAC frame in sequence to generate parity S1'; the wireless communication module 124 performs XOR operations on a third specific pattern and the sections S2, S3, . . . , SN of the duration/ID field of a third MAC frame in sequence to generate parity S1'; the wireless communication module 124 performs XOR operations on a fourth specific pattern and the sections S2, S3, . . . , SN of the duration/ID field of a fourth MAC frame in sequence to generate parity S1'; the wireless communication module 124 performs XOR operations on the first specific pattern and the sections S2, S3, . . . , SN of the duration/ID field of a fifth MAC frame in sequence to generate parity S1'; and the wireless communication module 124 performs XOR operations on the second specific pattern and the sections S2, S3, . . . , SN of the duration/ID field of a sixth MAC frame in sequence to generate parity S1', and so on.

Figure 8:
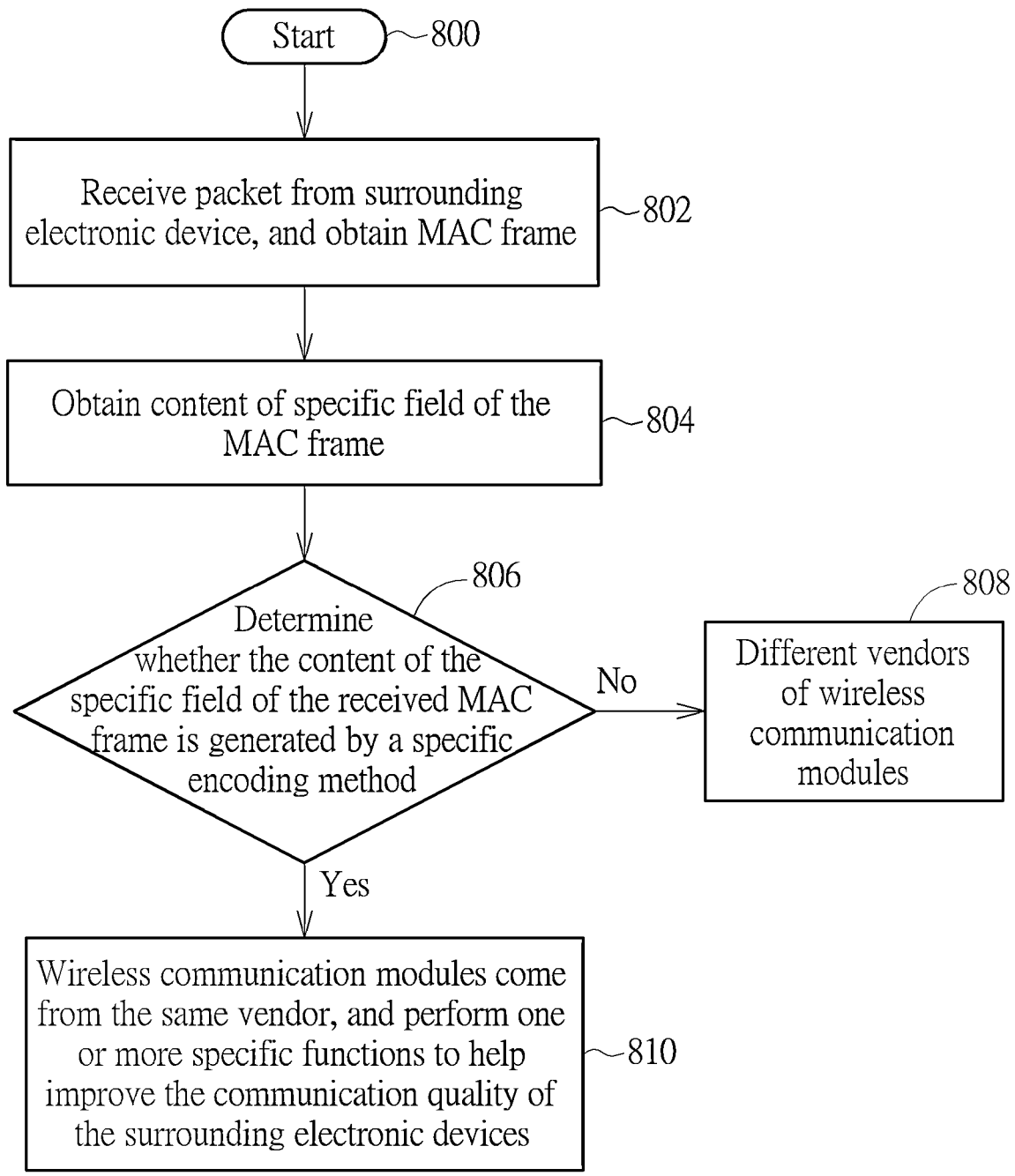
FIG. 8 is a flowchart of a control method of a station according to one embodiment of the present invention.

FIG. 8 is a flowchart of a control method of the station 110 according to one embodiment of the present invention. In Step 800, the flow starts, and the station 110 has established a connection with the AP 102. In Step 802, the wireless communication module 114 of the station 110 receives the packet from the surrounding electronic device through the antenna, such as the packet from the station 120, and obtains the MAC frame therein. In Step 804, the wireless communication module 114 obtains the content of a specific field in the MAC frame. In Step 806, the wireless communication module 114 determines whether the content of the specific field of the received MAC frame is generated by using a specific encoding method, if yes, the flow enters Step 810; and if not, the flow enters Step 808. For example, the specific field can be the duration/ID field in FIG. 3, and the specific encoding method can be steps for generating the modified duration/ID field mentioned in FIG. 5-FIG. 7. Taking FIG. 5 as an example, the wireless communication module 114 can divide the duration/ID field into four sections S1-S4, and the wireless communication module 114 performs XOR operation on the first part of the sections S2, S3, . . . , SN to generate a calculation result, and determines whether the calculation result matches the content of the second part of the sections S1. If it matches, it means that the content of the duration/ID field is generated by using the specific encoding method; if it does not match, it means the contents of the duration/ID field are not generated using this specific encoding method. Taking FIG. 6 as an example, the wireless communication module 114 can divide the duration/ID field into four sections S1-S4, and the wireless communication module 114 performs XOR operation on the sections S2, S3, . . . , SN and a specific pattern to generate a calculation result, and determines whether the calculation result matches the content of the section S1. If it matches, it means that the content of the duration/ID field is generated by using the specific encoding method; if it does not match, it means the contents of the duration/ID field are not generated using this specific encoding method.

In Step 808, the wireless communication module 114 determines that the vendor of the wireless communication module 124 of the station 120 is different from its own vendor.

In Step 810, the wireless communication module 114 determines that the vendor of the wireless communication module 124 of the station 120 is the same as its own vendor. Therefore, since the same vendor have the same or similar control methods and functions, the wireless communication module 114 can perform one or more specific functions to help improve the communication quality of the station 120. For example, the wireless communication module 114 can determine the communication quality of the station 120 by detecting the strength of the packets sent from the station 120. If the communication quality of the station 120 is not good, the wireless communication module 114 can actively enter a relay mode so that the station 120 can wirelessly communicate with the AP 102 through the station 110. In addition, the wireless communication module 114 can also actively notify the AP 102 to change the channel settings to try to improve the communication quality between the station 120 and the AP 102.

Briefly summarized, in the wireless communication method of the present invention, the station 120 can generate a modified specific field by performing a specific encoding method on a specific field of the MAC frame, and send the MAC frame to the surrounding electronic device, and the station 110 can determine whether the specific field of the received MAC frame is generated by the specific encoding method to determine whether the wireless communication modules of the two stations 110 and 120 are the chips from the same vendor, for subsequent specific operations to improve communication quality. In the present invention, since there is no need to add additional field and the content of the original MAC frame will not be substantially affected, it can be effectively and simply determined whether the wireless communication modules of the stations are from the same vendor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of an electronic device, comprising:
generating a media access control (MAC) frame;
performing a specific encoding operation on a specific field of the MAC frame to generate a parity;
using the parity to replace part of content of the specific field; and
generating a packet according to the MAC frame for sending to another electronic device.

2. The control method of claim 1, wherein the specific field is a duration/identity (duration/ID) field.

3. The control method of claim 1, wherein the step of performing the specific encoding operation on the specific field of the MAC frame to generate the parity comprises:
dividing the specific field into a plurality of sections; and
performing an operation on a first part of the plurality of sections to generate the parity; and
the step of using the parity to replace the part of content of the specific field comprises:
using the parity to replace a second part of the plurality of sections.

4. The control method of claim 3, wherein the specific field is a duration/ID field, the first part of the plurality of sections comprises a most significant bit (MSB), and the second part of the plurality of sections comprises a least significant bit (LSB).

5. The control method of claim 3, wherein the step of performing the operation on the first part of the plurality of sections to generate the parity comprises:
performing exclusive OR (XOR) operations on the first part of the plurality of sections to generate the parity.

6. The control method of claim 3, wherein the step of performing the operation on the first part of the plurality of sections to generate the parity comprises:
performing exclusive OR (XOR) operations on the first part of the plurality of sections and a specific pattern to generate the parity.

7. An electronic device, comprising:
a processing circuit; and
a wireless communication module;
wherein the wireless communication module is configured to perform the steps of:
  generating a media access control (MAC) frame;
  performing a specific encoding operation on a specific field of the MAC frame to generate a parity;
  using the parity to replace part of content of the specific field; and
  generating a packet according to the MAC frame for sending to another electronic device.

8. A control method of an electronic device, comprising:
receiving a packet from another electronic device;
determining whether a specific field of a media access control (MAC) frame of the packet is generated by a specific encoding method;
if the specific field of the MAC frame is generated by the specific encoding method, determining that a vendor of the another electronic device and a vendor of the wireless communication module in the electronic device are the same; and
if the specific field of the MAC frame is not generated by the specific encoding method, determining that the vendor of the another electronic device is different from the vendor of the wireless communication module in the electronic device.

9. The control method of claim 8, wherein the specific field is a duration/identity (duration/ID) field.

10. The control method of claim 8, wherein the step of determining whether the specific field of the MAC frame of the packet is generated by the specific encoding method comprises:
  dividing the specific field into a plurality of sections;
  performing an operation on a first part of the plurality of sections to generate a calculation result; and
  determining whether the calculation result matches a second part of the plurality of sections to determine whether the specific field of the MAC frame is generated by the specific encoding method.

11. The control method of claim 10, wherein the step of performing the operation on the first part of the plurality of sections to generate the calculation result comprises:
  performing the operation on the first part of the plurality of sections and a specific pattern to generate the calculation result.

12. The control method of claim 8, further comprising:
  if the specific field of the MAC frame is generated by the specific encoding method, actively entering a relay mode to make the another electronic device to communicate with an access point through the electronic device.

* * * * *